US012264790B2

(12) United States Patent
Van Bommel et al.

(10) Patent No.: US 12,264,790 B2
(45) Date of Patent: Apr. 1, 2025

(54) INTEGRATED SOLID STATE LIGHT SOURCE AND PHOSPHOR MODULE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/575,983

(22) PCT Filed: Jun. 20, 2022

(86) PCT No.: PCT/EP2022/066732
§ 371 (c)(1),
(2) Date: Jan. 2, 2024

(87) PCT Pub. No.: WO2023/274770
PCT Pub. Date: Jan. 5, 2023

(65) Prior Publication Data
US 2025/0020289 A1    Jan. 16, 2025

(30) Foreign Application Priority Data

Jul. 1, 2021    (EP) .................... 21183068

(51) Int. Cl.
*F21K 9/62*    (2016.01)
*F21K 9/64*    (2016.01)
(Continued)

(52) U.S. Cl.
CPC ............. *F21K 9/62* (2016.08); *F21K 9/64* (2016.08); *F21V 29/506* (2015.01); *H05B 47/17* (2020.01);
(Continued)

(58) Field of Classification Search
CPC . F21K 9/62; F21K 9/64; F21V 29/506; H05B 47/17
See application file for complete search history.

(56) References Cited

U.S. PATENT DOCUMENTS

2009/0101930 A1    4/2009  Li
2010/0328926 A1*  12/2010  Hoelen ................ C09K 11/778
                                                                    362/84
(Continued)

FOREIGN PATENT DOCUMENTS

DE    102016201606 A1    8/2017
DE    102018211342 A1    1/2020
(Continued)

*Primary Examiner* — Evan P Dzierzynski
*Assistant Examiner* — Nathaniel J Lee

(57) ABSTRACT

The invention provides a light generating system (1000) comprising a first light generating device (110), a second light generating device (120), a first luminescent material (210), a window element (400), and a light mixing chamber (500), wherein: (A) the first light generating device (110) is configured to provide first device light (111); wherein the first light generating device (110) comprises one or more of a laser and a superluminescent diode; (B) the second light generating device (120) is configured to generate second device light (121); wherein the second light generating device (120) comprises a solid state light source; (C) the light mixing chamber (500) is at least partly defined by the window element (400); (D) the window element (400) comprises (i) a first window element part (410) comprising the first luminescent material (210), wherein the first window element part (410) is configured in a light receiving relationship with the first light generating device (110), and (ii) a second window element part (420), wherein the second window element part (420) is translucent for the second device light (121), and wherein the second window element part (420) is configured in a light receiving relationship with (Continued)

the second light generating device (120); wherein the first window element part (410) and the second window element part (420) are configured in thermal contact with each other, wherein the first window element part (410) and the second window element part (420) differ in material composition; and (E) the first luminescent material (210) is configured to convert at least part of the first device light (111) into first luminescent material light (211).

15 Claims, 3 Drawing Sheets

(51) Int. Cl.
| | |
|---|---|
| *F21V 29/506* | (2015.01) |
| *H05B 47/17* | (2020.01) |
| *F21Y 113/20* | (2016.01) |
| *F21Y 115/10* | (2016.01) |
| *F21Y 115/30* | (2016.01) |
| *G03B 21/20* | (2006.01) |

(52) U.S. Cl.
CPC ........ *F21Y 2113/20* (2016.08); *F21Y 2115/10* (2016.08); *F21Y 2115/30* (2016.08); *G03B 21/2013* (2013.01); *G03B 21/204* (2013.01)

(56) References Cited

U.S. PATENT DOCUMENTS

2013/0093362 A1\* 4/2013 Edwards .................. F21S 4/28
359/326
2018/0347773 A1 12/2018 Bergenek et al.

FOREIGN PATENT DOCUMENTS

KR 20170142760 A 12/2017
WO 2020257091 A1 12/2020

\* cited by examiner

INTEGRATED SOLID STATE LIGHT SOURCE AND PHOSPHOR MODULE

CROSS-REFERENCE TO PRIOR APPLICATIONS

This application is the U.S. National Phase application under 35 U.S.C. § 371 of International Application No. PCT/EP2022/066732, filed on Jun. 20, 2022, which claims the benefit of European Patent application Ser. No. 21/183,068.2, filed on Jun. 1, 2021. These applications are hereby incorporated by reference herein.

FIELD OF THE INVENTION

The invention relates to a light generating system as well as to a light generating device comprising such system. The invention also relates to a method for controlling a beam shape.

BACKGROUND OF THE INVENTION

Light generating devices with multiple light sources are known in the art. US2018/0347773, for instance, describes a light generating device, comprising at least one light emitting diode having a semiconductor layer that emits a first primary light, and having a phosphor layer arranged on the semiconductor layer, and at least one laser for generating at least one laser beam composed of a second primary light, by means of which the phosphor layer is irradiatable, wherein the phosphor layer is configured for at least partly converting the first primary light into at least one first secondary light and for at least partly converting the second primary light into at least one second secondary light. The light generating device of US2018/0347773 is configured to dynamically illuminate the phosphor layer by means of the second primary light.

DE102016201606A1 discloses a lighting device with an LED for emitting LED radiation, a laser for emitting laser radiation and a phosphor element for at least partial conversion of the LED radiation and the laser radiation into a conversion light. During operation of the lighting device there is an LED irradiation surface irradiated with the LED radiation on the irradiation surface of the phosphor element and a laser irradiation surface irradiated with the laser radiation on the irradiation surface of the phosphor element, with at least an overlap in the irradiation surfaces.

SUMMARY OF THE INVENTION

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

There is a desire for high intensity light generating systems or devices and/or light generating systems or devices having a controllable spectral power distribution, and/or light generating systems or devices having a controllable spatial power distribution of the light generated by the light generating systems or device. Further, there is a desire to reduce heat generation.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

In an aspect, the invention provides a light generating system ("system") comprising a first light generating device, a second light generating device, and a first luminescent material. Further, the light generating system comprises a window element. Yet further, the light generating system may also comprise a light mixing chamber. The first light generating device is configured to provide first device light, in the light mixing chamber. The first light generating device comprises one or more of a laser and a superluminescent diode. Further, especially the second light generating device is configured to generate second device light in the light mixing chamber. The second light generating device comprises a solid state light source. Further, the light mixing chamber defined by the window element and reflective walls, wherein the reflective walls having an average reflectivity for the second device light of at least 50%. The window element may comprises (i) a first window element part comprising the first luminescent material, wherein the first window element part is configured in a light receiving relationship with the first light generating device, and (ii) a second window element part, wherein the second window element part is translucent for the second device light and does not comprise a luminescent material for conversion of the second device light, and wherein the second window element part is configured in a light receiving relationship with the second light generating device. The first window element part and the second window element part are configured in thermal contact with each other. The first window element part and the second window element part differ in material composition. The first luminescent material may be configured to convert at least part of the first device light into first luminescent material light. The reflectivity of the second window part is selected from the range of 30-70% for the second device light. Hence, the invention provides a light generating system comprising a first light generating device, a second light generating device, a first luminescent material, a window element, and a light mixing chamber, wherein: (A) the first light generating device is configured to provide first device light (in the light mixing chamber); wherein the first light generating device comprises one or more of a laser and a superluminescent diode; (B) the second light generating device is configured to generate second device light (in the light mixing chamber); wherein the second light generating device comprises a solid state light source; (C) the light mixing chamber is at defined by the window element and reflective walls, wherein the reflective walls having an average reflectivity for the second device light of at least 50%; (D) the window element comprises (i) a first window element part comprising the first luminescent material, wherein the first window element part is configured in a light receiving relationship with the first light generating device, and (ii) a second window element part, wherein the second window element part is translucent for the second device light, and wherein the second window element part is configured in a light receiving relationship with the second light generating device; wherein the first window element part and the second window element part are configured in thermal contact with each other; wherein the first window element part and the second window element part differ in material composition; and (E) the first luminescent material is configured to convert at least part of the first device light into first luminescent material light. The reflectivity of the second window part is selected from the range of 30-70% for the second device light and the second window element part does not comprise a luminescent material that is configured to convert the second device light.

With such light generating system it may be possible to control a spatial power distribution of the light emanating away from the system. The first light generating device may be used for providing a narrower beam and/or a more central beam. The second light generating device may be used to provide a broader beam and/or a beam at least partially surrounding the narrower beam or a more central beam. Further, relatively intense beams may be provided. Yet further, it may be possible to manage the heat. Further, it may be possible to create a relatively small light package. Also, with the present invention a transmissive mode solution can be provided. In the transmissive mode, it may be relatively easy to have light source light admixed in the luminescent material light, which may be useful for generating the desirable spectral power distribution.

As indicated above, the light generating system may comprise a first light generating device and a second light generating device. The first light generating device may be configured to provide first device light and the second light generating device may be configured to generate second device light. In specific embodiments, the first device light and the second device light differ in spectral power distribution, though this is not necessarily the case in all embodiments. Hence, in specific embodiments the first device light and the second device light may differ in color point. In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

As indicated above, the first device light and second device light are not necessarily different. However, the light emanating from the window element may differ when using the first light generating device or when using the second light generating device. When using the first light generating device, at least part of the first device light is converted by the first luminescent material. Hence, when using the first light generating device (only), downstream of the window element first luminescent material light may be observed. However, when using the second light generating device, there may essentially be no conversion of the second device light by a luminescent material (or a substantially absorbing material). Hence, when using the second light generating device (only), downstream of the window element essentially spectrally unaltered second device light may be observed.

The term "light generating device" may refer to one or more light generating devices. Each light generating device may comprise one or more light sources, especially one or more solid state light sources.

The term "light source" may in principle relate to any light source known in the art. It may be a conventional (tungsten) light bulb, a low-pressure mercury lamp, a high-pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi-LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi-LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light as such, like a blue LED, is a light source. A combination of a solid state light source (as light generating element) and a light converter element, such as a blue LED and a light converter element, optically coupled to the solid state light source, may also be a light source. Hence, a white LED is a light source.

The term "light source" herein may also refer to a light source comprising a solid state light source, such as an LED or a laser diode or a superluminescent diode. The "term light source" may (thus) in embodiments also refer to a light source that is (also) based on conversion of light, such as a light source in combination with a luminescent converter material. Hence, the term "light source" may also refer to a combination of a LED with a luminescent material configured to convert at least part of the LED radiation, or to a combination of a (diode) laser with a luminescent material configured to convert at least part of the (diode) laser radiation.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

In specific embodiments, the light generating device may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

For instance, including second and third harmonic generation embodiments, the light source may comprise one or more of an F center laser, a yttrium orthovanadate ($Nd:YVO_4$) laser, a promethium 147 doped phosphate glass ($147Pm^{3+}$:glass), and a titanium sapphire (Ti:sapphire; $Al_2O_3$:$Ti^{3+}$) laser. For instance, considering second and third harmonic generation, such light sources may be used to generated blue light. Further, e.g. an InGaN laser may be applied.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

Superluminescent diodes are known in the art. A superluminescent diode may be indicated as a semiconductor device which may be able to emit low-coherence light of a broad spectrum like a LED, while having a brightness in the order of a laser diode.

US2020/192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) "is an emitter, which combines the features of laser diodes and light-emitting diodes. SLD emitters utilize the stimulated emission, which means that these devices operate at current densities similar to those of laser diodes. The main difference between LDs and SLDs is that in the latter case, we design the device waveguide in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications.

Especially, in embodiments the first light generating device comprises one or more of a laser and a superluminescent diode. Further, especially in embodiments the second light generating device may (also) comprise a solid state light source, especially an LED. In further specific embodiments, the second light generating device comprises one or more LEDs. In yet other embodiments, the second light generating device does not comprise one or more of a laser and a superluminescent diode. Yet, in specific embodiments, the first light generating device does not comprise a LED and the second light generating device comprises one or more LEDs. Especially, the first light generating device may in embodiments comprise one or more of a laser and a superluminescent diode, and does not comprises a LED, and the second light generating device may comprise in embodiments one or more light emitting diodes (LEDs) and does not comprise one or more of a laser and a superluminescent diode.

The light generating system may further comprise a first luminescent material. Especially, the first luminescent material may be configured to convert at least part of the first device light into first luminescent material light. In specific embodiments, the second light generating device may comprise a second luminescent material which may be configured to convert part of the light of a (solid state) light source of the second light generating device. In such embodiments, the second device light may comprise second luminescent material light. Note that in embodiments the first luminescent material and the second luminescent material may be different luminescent materials. Especially, the spectral power distribution of the first luminescent material light and the second luminescent material light are different. For instance, in embodiment the first luminescent material light and the second luminescent material light have different color points. However, it is herein not excluded that the first luminescent material and the second luminescent material may essentially be the same.

For instance, in embodiments the second light generating device comprises a phosphor converted LED (PC LED). Such LED may comprise a light emitting diode with luminescent material (i.e. second luminescent material) on the die of the light emitting diode that is configured to convert at least part of the primary light of the solid state light source into second luminescent material light. Such second light generating device may be configured to provide white second device light. The first light generating device may be configured to generate substantially the same type of light primary light, which may at least partly converted by the remote first luminescent material. In such embodiments, the light downstream of the first window element part may also be white light, based on conversion of the first device light by the first luminescent material.

Note, however, that the first luminescent material and second luminescent material may also be different. As can also be derived from the below, the term "first luminescent material" may also refer to a (first) combination of different first luminescent materials. Likewise, the term "second luminescent material" may also refer to a (second) combination of different second luminescent materials. The combinations may be different combinations. Here below, some further explanation and embodiments of luminescent materials are provided.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise up-converter luminescent material, i.e. radiation of a larger wavelength is converted into radiation with a smaller wavelength ($\lambda_{ex} > \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq0.2$, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq0.2$, wherein $y1+y2=1$, wherein $0\leq y2\leq0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu$^{2+}$). For instance, assuming 2% Eu in CaAlSiN$_3$:Eu, the correct formula could be (Ca$_{0.98}$Eu$_{0.02}$)AlSiN$_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu$^{2+}$). For instance, assuming 2% Eu in CaAlSiN$_3$:Eu, the correct formula could be (Ca$_{0.98}$Eu$_{0.02}$)AlSiN$_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$: $Ce^{3+}$), or similar compounds, or BAM ($BaMgAl_{10}O_{17}$: $Eu^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

As indicated above, the light generating system may comprise a light mixing chamber. This may especially imply that the first light generating device and/or the second light generating device, especially both the first device and the second device, may be configured remote from the window element. Especially at least the first light generating device is configured remote from the window element, more especially at least remote from the first luminescent material, like at least 1 μm, more especially at least 10 μm, yet even more especially at least about 0.1 mm, like at least about 0.5 mm.

The light mixing chamber may be a cavity wherein the first light generating device and/or the second light generating device provide their respective device light. Hence, respective light emitting areas, like dies, may be configured in the light mixing chamber. Therefore, in embodiments the first light generating device may be configured to provide first device light in the light mixing chamber. Yet further, in embodiments the second light generating device may be configured to generate second device light (in the light mixing chamber).

The light mixing chamber is defined by reflective walls and the window element. The term "wall" may refer to essentially any face, like a side wall and a bottom wall. The latter may e.g. at least partly be provided by a printed circuit board. Light provided in the light mixing chamber may therefore be reflected by the reflective walls or be transmitted by the window element or be converted by the window element (see also below). Especially, part of the light provided in the light mixing chamber will be transmitted by the window, i.e. especially transmitted through the second window element part and part of the light may be converted by the first window element part (and at least part thereof may also leave the light mixing chamber). Light that is not reflected by the window element or transmitted by the window element or converted by the window element may be reused and may after one or more reflection reach the window element again, which may allow a further change to escape from the light mixing chamber and be transmitted or converted. In addition, some degree of mixing of the light in the mixing chamber allows a more uniform light output by the second window element part. Hence, the light mixing chamber may at least partly be defined by the window element.

The light mixing chamber is defined by light reflective walls and by the window element. The reflective are reflective for at least the second device light, and optionally also for the first device light. Especially, the reflective walls are reflective for both the first device light and the second device light. When averaging over the internal surface area of the light mixing chamber not taking into account the window element, the average reflectivity for the second device light—under perpendicular irradiation—is at least 50%, even more especially at least 70%, yet even more especially at least 85%, such as at least 90%. Further, especially, when averaging over the internal surface area of the light mixing chamber not taking into account the window element, the average reflectivity for also the first device light—under perpendicular irradiation—may be at least 50%, even more especially at least 70%, yet even more especially at least 85%, such as at least 90%. For instance, the walls may comprise an alumina coating or a Teflon coating, or may be reflective as such (see also below). Herein, reflectivity or transmission are especially defined under perpendicular irradiation. Note that this does not necessarily apply that the light for which the reflectivity or transmission of an element is defined, reaches the element (only) under perpendicular irradiation.

Especially, the window element comprises (i) a first window element part comprising the first luminescent material, wherein the first window element part is configured in a light receiving relationship with the first light generating device.

The terms "light-receiving relationship" or "light receiving relationship", and similar terms, may indicate that an item may during operation of a source of light (like a light generating device or light generating element or light generating system) may receive light from that source of light. Hence, the item may be configured downstream of that source of light. Between the source of light and the item, optics may be configured. Amongst others, the optics may comprise a reflector, a collimator, a lens, a lens array, a refractive optical component, a diffractive optical component, a light scattering optical component, or a plurality of one of the afore-mentioned, or a combination of two or more of the aforementioned, etc.

The terms "upstream" and "downstream", such as in the context of propagation of light, may especially relate to an arrangement of items or features relative to the propagation of the light from a light generating element (here the especially the . . . ), wherein relative to a first position within a beam of light from the light generating element, a second position in the beam of light closer to the light generating element (than the first position) is "upstream", and a third position within the beam of light further away from the light generating element (than the first position) is "downstream". For instance, instead of the term "light generating element" also the term "light generating means" may be applied.

The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material. The term "in a light-receiving relationship" does, as indicated above, not exclude the presence of intermediate optical elements, such as lenses, collimators, reflectors, dichroic mirrors, etc. In embodiments, the term "light-receiving relationship" and "downstream" may essentially be synonyms.

Especially, essentially all light generated by the first light generating device may irradiate (an upstream face of) the first window element. For instance, this may also be facilitated by using optics. For instance, in embodiments the first device light may be focused on the first window element. As part of the first device light may be reflected by the first window element, the use of the light mixing chamber may be advantageous. However, it appears useful when the first light generating device, and optional optics, are configured such that at least 70% (based on the power of the first device light), yet even more especially at least 85%, such as at least 90%, irradiates the first window element. Hence, only a small part, or even substantially no first device light may reach the second window element, unless it is reflected by the first window element and reaches via one or more reflection in the light mixing chamber the second window element.

In embodiments, the first window element may be transmissive for the first device light. For instance, in embodiments 5-50% (based on the power of the first device light), like 5-40%, of the first device light may be transmitted by the first window element and may propagate away from (a downstream face of) the first window element together with first luminescent material light. For instance, this may apply when the first device light comprises one or more of blue and green light, especially blue light, like a blue light emitting first light generating device (like a blue LED). In yet other embodiments, however, essentially all first device light is absorbed by the first window element (especially by the first luminescent material). For instance, in embodiments less than 5% (based on the power of the first device light) of the first device light, even more especially at maximum 1%, such as at maximum about 0.1%, may be transmitted by the first window element and may propagate away from the first window element together with first luminescent material light. The transmission may e.g. be controlled by controlling the absorption strength of the first luminescent material, the abundance of the first luminescent material in the first window element, as well as the thickness of the first window element. A low transmission of first device light by the first window element may especially be desirable when the first device light comprises UV radiation of violet light, such as in the case of a UV emitting first light generating device.

Hence, in embodiments the first window element may be transmissive (transparent or translucent) for the first device light and in other embodiments the first window element may essentially not be transmissive for the first device light.

As indicated above, the window element may also comprise a second window element part. Especially, the second window element part is translucent for the second device light. Hence, (second device) light that is received by (an upstream face of) the second window element part may be transmitted by the second window element part. However, this transmission may include one or more scatterings in the second window element part and/or at a surface of the second window element part. Hence, the second device light downstream of the second window element part may be a relatively broad beam. Scattering of the (second device) light may be obtained by scattering elements.

The second window element part may comprise scattering elements. This may include one or more of elements embedded by the light transmissive material, and elements at a face of the second window element part (such as at one or more of the first face and the second face, see also below).

The scattering elements may comprise particles embedded in the light transmissive material of the second window element part. Such particles may be scattering particles (like e.g. comprising one or more of $Al_2O_3$, $BaSO_4$ and $TiO_2$). The scattering elements may comprise elements at one or more faces of the second window element part, like indentations, scratches, grooves, dots of material, light scattering structures (in optical contact with one of the faces), etc. etc. The scattering elements may be used to scatter the second device light. The scattering elements may provide the translucent characteristics of the second window element. For instance, the second window element part may comprise a crystalline, ceramic, or polymeric material, that is as such substantially transparent for the second device light, but, due to the presence of scattering elements, is translucent.

As indicated above, the second window element part may be configured in a light receiving relationship with the second light generating device.

Especially, a substantial part of the light generated by the second light generating device may irradiate (an upstream face of) the second window element. For instance, this may also be facilitated by using optics (and/or by choosing the position of the second light generating device). As part of the second device light may be reflected by the second window element, the use of the light mixing chamber may be advantageous. However, it appears useful when the second light generating device, and optional optics, are configured such that at least 50% (based on the power of the second device light), yet even more especially at least 70%, such as at least 85%, irradiates the second window element. For instance, this may also be facilitated by using optics. For instance, in embodiments the second device light may be focused on the second window element. Hence, a part, or only a small part, second device light may reach the first window element, unless it is reflected by the second window element and reaches via one or more reflection in the light mixing chamber the second window element.

In embodiments, the first window element part may be configured in the center of the window element part. In more specific embodiments, the first window element part is (laterally) enclosed by the second window element part (with optionally the optional reflector in between). In specific embodiments, the first window element part has circular cross-sectional shape, like a disc. In further specific embodiments, the second window element may also be circular (like a ring). In yet other embodiments, the second window element part may have a rectangular cross-sectional shape.

During operation of the first light generating device, the first window element part may be heated, e.g. due to Stokes losses of the first luminescent material. Hence, in view of thermal management, it may be desirable that the first window element part may dissipate heat, such as via the second window element part. Hence, in embodiments the first window element part and the second window element part may be configured in thermal contact with each other.

An element may be considered in thermal contact with another element if it can exchange energy through the process of heat. Hence, the elements may be thermally coupled. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less, such as 1 μm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 μm or less (though larger average distances may be possible, such as up to 100 μm). In embodiments, the two surfaces of the two elements may be kept at a distance with one or more distance holders. When two elements are in thermal contact, they may be in physical contact or may be configured at a short distance of each other, like at maximum 10 μm, such as at maximum 1 mm. When the two elements are configured at a distance from each other, an intermediate material may be configured in between, though in other embodiments, the distance between the two elements may filled with a gas, liquid, or may be vacuum. When an intermediate material is available, the larger the distance, the higher the thermal conductivity may be useful for thermal contact between the two elements. However, the smaller the distance, the lower the thermal conductivity of the intermediate material may be (of course, higher thermal conductive materials may also be used).

A thermally conductive element especially comprises thermally conductive material. A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

As indicated above, the first window element part and the second window element part may have different functions. The first window element part may especially be configured to convert at least part of the first device light. The first window element part may be transmissive for the first device light, but is not necessarily transmissive for the first device light. The second window element is especially transmissive for the second device light. Further, the second window element has substantially no conversion of the second device light (as primary light) into secondary light. Hence, the second window does not comprise a (second) luminescent material that is configured to convert the second device light. For instance, under perpendicular irradiation with second device light, less than 1% (based on the power of the second device light) may be converted into luminescent material, like equal to or less than 0.1%. For instance, in embodiments, the conversion of first device light by the first window element part (i.e. the first luminescent material), may be at least 10 times higher, like at least 100 times higher, than a possible conversion of second device light by the second window element part (i.e. a (second) luminescent material that might be comprised by the second window element part).

Especially, the first window element part and the second window element part differ in material composition. For instance, the compositions may be substantially the same, but the first window element part comprises a luminescent material and the second window element part does not comprise (such) luminescent material (and/or other luminescent material). For instance, both the first window element part and the second window element part may comprise a garnet material, but the first window element part comprises the activator $Ce^{3+}$. Or, in embodiments both the first window element part and the second window element part may comprise a (oxy)nitride material, but the first window element part comprises the activator $Eu^{2+}$. Of course, the difference in material composition may also be larger, like the first window element part comprising a cerium comprising garnet and the second window element part comprising a polymeric material.

As can be derived from the above, in specific embodiments (but not exclusively), the second device light may be white light and/or the light downstream of the first window element part, due to irradiation of the first luminescent material with the first device light, is white light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the first window element part may be configured to transmit part of the first device light, wherein in an operational mode of the light generating system the first light generating device and first luminescent material are configured to generate white light emanating from a downstream side of the first window element part, wherein the white light comprises first luminescent material light and transmitted first device light. For instance, in embodiments the first light generating device may be configured to generate blue first device light, and wherein the first luminescent material is configured to convert at least part of the first device light into first luminescent material light having intensity at one or more wavelengths selected from the wavelength range of 530-750 nm. For instance, the first luminescent material light may comprise yellow light, or yellow and red light, or the first luminescent material light may comprise green light and red light, etc.

Alternatively, in embodiments the first window element part may be configured to transmit less than 1% of the first device light reaching the first window element part, wherein in an operational mode of the light generating system the first light generating device and first luminescent material are configured to generate white light emanating from a downstream side of the first window element part, wherein the white light comprises the first luminescent material light.

Note that the light downstream of the first window element is not necessarily white light. In embodiments, the first window element part may configured to transmit part of the first device light, wherein in an operational mode of the light generating system the first light generating device and first luminescent material are configured to generate colored light emanating from a downstream side of the first window element part, wherein the white colored comprises first luminescent material light and transmitted first device light. Alternatively, in embodiments the first window element part may be configured to transmit less than 1% of the first device light reaching the first window element part, wherein in an operational mode of the light generating system the first light generating device and first luminescent material are configured to generate colored light emanating from a downstream side of the first window element part, wherein the colored light comprises the first luminescent material light. Likewise, the light downstream of the second window element is not necessarily white light. In such embodiments, the second light generating device may be configured to generate (in an operational mode) colored light.

As indicated above, especially the second window element part may transmit part of the second device light. In embodiments, the second window element part is configured to transmit at least 30% of the second device light under perpendicular radiation of the second device light, such as up to about 70%. Further, as indicated above, especially the second window element part may reflect part of the second device light. Hence, in specific embodiments the second window element part is configured to transmit at least 30% of the second device light under perpendicular radiation of the second device light, such as up to about 70%, and is configured to reflect at least 30% of the second device light under perpendicular radiation of the second device light, such as up to about 70%. For instance, 50% may be reflected, and 50% may be transmitted.

The reflectivity of the second window part is selected from the range of 30-70% for second device light. Further, in specific embodiments at least 70% of the second device light which escapes from the window element escapes via the second window element. Hence, in specific embodiments the reflectivity of the second window part is selected from the range of 30-70% for second device light; and wherein at least 70% of the second device light which escapes from the window element escapes via the second window element, such as at least 80%, even more especially at least 90%, such as at least about 95%.

Further, at least 70% of the first device light which escapes from the window element escapes via the first window element, such as at least 80%, even more especially at least 90%, such as at least about 95%.

The first window element part and the second window element part may each individually be selected from the group of ceramic body, a crystalline body, a polycrystalline body (such as a glass body or a multi-layer body), and a polymeric body. Especially, in embodiments the first window element part comprises a ceramic body. Alternatively or additionally, the second window element part comprises a ceramic body. Hence, in specific embodiments the first window element part comprises a ceramic body, and wherein the second window element part comprises a ceramic body. ceramic bodies may be relatively stable and/or have a relatively good thermal conduction.

In embodiments, the window element essentially consists of the first window element part and the second window element part.

It may be desirable that first luminescent material light (generated in the first window element part), or the first device light and the first luminescent material light (generated in the first window element part), does not substantially enter the second window element part (e.g. by light guiding from the first window part to the second window part). For instance, the beam of first luminescent material light (and optionally the first device light) may be narrower than a beam of second device light. Would, however, first luminescent material light, or the first device light and the first luminescent material light, escape via the second window element part, the light output surface will increase and thus the collimation performance will decrease. Hence, it may be desirable to optically separate the first window element part and the second window element part. An optically separation element may at least partly be arranged between the first window element part and the second window element part. A distance of more than about 0.5 µm, such as at least about 1 µm may be useful, would there be no light transmissive material in between, or only light transmissive material with a substantially higher index of refraction. However, another solution is to use a reflector between the first window element part and the second window element part. Hence, in embodiments the first window element part and the second window element part are at least partly (optically) separated by an element (herein also indicated in embodiments as "optical separation element"), such as especially optically) separated by reflective element, such as a reflective layer.

The optically separation element, such as a reflector, may be (highly) reflective e.g. having a reflectivity ≥70%, especially ≥75%, more especially ≥80%, most especially ≥85%.

Hence, in (other) embodiments, the window element essentially consists of the first window element part, the second window element part, and the optional optical separation element.

Especially, in embodiments, at least 80%, like at least 90% of an external area of the window element may be defined by the first window element part and the second window element part.

As indicated above, it may be desirable that the first window element part and the second window element part are thermally coupled. Hence, the reflector may be chosen to have a thermal conductivity that is higher than of one or more of the first window element part and the second window element part, especially higher than both of the first window element part and the second window element part. Further, the reflector may have a relative small thickness, like at maximum about 2 mm, like at maximum about 1 mm, such as at maximum about 0.1 mm, such as at maximum about 10 μm. However, thinner reflectors may also be possible, such as at maximum 1 μm, or even smaller, like at maximum 0.1 μm. For instance, a reflector layer may be deposited on part of an edge of the first window element part and/or a reflector layer may be deposited on part of an edge of the second window element part. Hence, the layer thickness of the reflector may e.g. be at least about 5 nm, such as at least about 10 nm, such as at least about 50 nm. In specific embodiments, the reflective element may have a thickness (d1) of at maximum 1 μm, and the reflective element may have a higher thermal conductivity than the first window element part and/or the second window element part. The phrase "a higher thermal conductivity than the first window element part and/or the second window element part", and similar phrases may indicated that the thermal conductivity is higher than the first window element part and/or higher than of the second window element part. Especially, in embodiments the thermal conductivity may be higher than each of the first window element part and the second window element part. In specific embodiments, the reflective element may comprise one or more of aluminum, silver and copper. However, other reflective materials may also be possible.

The second window element part may in embodiments be used to beam shape the light emanating away from the downstream side of the first window element part. For instance, the second window element part may have a cavity configured downstream of the downstream side of the first window element part. This cavity may in specific embodiments have the shape of a reflector, such as a hollow collimator. Hence, the second window element part may in embodiments be thicker than the first window element part. Therefore, in embodiments the first window element part may have a first height (h1) and the second window element part may have a second height (h2), wherein h1<h2. Especially, in embodiments the first window element part may have a first height (h1) and the second window element part may have a second height (h2), wherein h1<h2, and wherein the second window element part may define a second window element cavity configured at a downstream side of the first window element part.

In embodiments, h2≥1.1*h1, especially h2≥1.3*h1, more especially h2≥1.5*h1, most especially h2≥1.7*h1. In embodiments, h2≤7*h1, especially h2≤5*h1, more especially h2≤4*h1, most especially h2≤3*h1. The cavity may have a depth h3. Hence, in embodiments 0.1*h2≤h3≤0.9*h2, especially 0.2*h2≤h3≤0.8*h2, more especially 0.3*h2≤h3≤0.7*h2, most especially 0.4*h2≤h3≤0.6*h2. Hence, in embodiments 0.1*h1≤h3≤5*h1, especially 0.3*h1≤h3≤4*h1, more especially 0.4*h1≤h3≤3*h1, most especially 0.5*h1≤h3≤2*h1. In embodiments, the first window element part has a first cross-sectional area A1. Especially, h3≥SQRT(A1).

Especially, the wall(s) of the cavity are slanted. Hence, the cross-sectional area of the cavity closer to the first window element part may be larger than further away from the first window element part. Especially, the cross-sectional area increases with increasing distance from the first window element part.

In specific embodiments, the second window element cavity may (thus) be configured as reflector cavity wherein at a light entrance side of the second window element cavity at least part of the first window element part is configured. The light entrance side of the second window element cavity may in embodiments essentially coincide with the downstream face of the first window element.

As can be derived from the above, the cavity may be used for beam shaping the light that emanates from the downstream side of the first window element part.

As indicated above, the first window element part may have a first cross-sectional area A1. Further, the second window element part may have a second cross-sectional area A2. Especially, in embodiments 0.001≤A1/A2≤0.1, especially 0.005≤A1/A2≤0.05. Hence, in embodiments the first window element part has a first cross-sectional area A1, wherein the second window element part has a second cross-sectional area A2, wherein 0.001≤A1/A2≤0.1. The window element may have a third cross-sectional area A3. Especially A3≈A1+A2. The (slight) difference may be due to the presence of the optional reflector between the first window element part and the second window element part. Especially, however, (A1+A2)/A3≥0.9.

Hence, in embodiments an external area of the window element may substantially be determined by the second window element part and for a smaller part by the first window element part (and for a smaller part (than also of the second window element part) by the optional optical separation element).

Especially, in embodiments the (area of the) downstream face of the first window part element is substantially smaller than the (area of the) downstream face of the second window element. Further, it may be desirable to substantially collimate the light emanating from the first window element. For this reason, the (area of the) downstream face of the first window part element may be relatively small, and substantially smaller than the area of the second window element part.

In embodiments, the window element may thus have a third cross-sectional area A3. Especially, $A_1/A_3 < A_2/A_3$. For instance, in embodiments $A_1/A_3 \leq 0.25 * A_2/A_3$.

In specific embodiments, A1 may especially be equal to or less than about 16 mm², more especially ≤9 mm², most preferably ≤4 mm², such as e.g. selected from the range of 0.5-2 mm². Hence, A1 may in embodiments be at least 0.5 mm², but especially not larger than about 16 mm².

As indicated above, a beam of first luminescent material light (and optionally first device light) may be narrower than a beam of second device light. In specific embodiments, the light from the first window element may be collimated to ≤6° FWHM, preferably ≤5°, more preferably <4°, most preferably ≤3° FWHM (full width half maximum). Typically the light from the second window element may be collimated to ≥7° FWHM, such as especially ≥10°, more preferably ≥15°, most preferably ≥20 such as for example 25° FWHM. In specific embodiments, the difference between the second full width half maximum of a second beam of second device light downstream of the second window element and the first full width half maximum of a first beam of first luminescent material light and optionally first device light, may be indicated as FWHM2-FWHM1, and may be at least 5°, especially ≥10°, more especially ≥15°, yet even more especially ≥20°. The relative narrow beams may be obtained with optics, such as collimating optics, such as lenses, reflectors, collimators, compound parabolic concentrator type optical elements, etc. Such optics may be configured downstream of the window element (i.e. downstream of both the first window element and the second window element).

For heat generated by the luminescent material and/or heat generated by the light generating devices, it may be desirable that such heat can be dissipated. To this end, the light generating system may comprise one or more thermally conductive elements. Especially, the light generating system may comprise one or more of a heat sink, a heat pipe, and a heat spreader. Heat may reach such element(s) via intermediate thermally conductive elements (see also above). In embodiments, (intermediate) thermally conductive elements may also be used to provide the light mixing chamber, optionally in combination with a light reflective layer on such thermally conductive element(s). Especially, such thermally conductive element(s) have a higher thermal conductivity than the first window element part and/or the second window element part. Hence, in embodiments the system may further comprise a thermally conductive element (having a higher thermal conductivity than the first window element part and the second window element part), wherein the light mixing chamber may partly be defined by the thermally conductive element, wherein the thermally conductive element may comprise or is thermally coupled to one or more of a heat sink, a heat pipe, and a heat spreader.

As indicated above, the beam of light emanating for the downstream side of the first window element may be narrower than the beam of light emanating for the downstream side of the second window element. Hence, by controlling the first light generating device and the second light generating device, the beam shape of the light emanating from the system may be controlled. To this end, the system may comprise a control system. Therefore, in embodiments the system may further comprise a control system configured to control a beam shape of system light emanating from the light generating system by controlling the first light generating device and the second light generating device.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Downstream of the window element, further optics may be available. However, in specific embodiments the further optics may have substantially no impact on the beam angle of the beams of first luminescent material light and the second device light, respectively. However, in other embodiments the further optics may have impact on the beam angle of the beams of first luminescent material light and the second device light, respectively. In specific embodiments, collimating optics may be configured downstream of the first window element, like a lens, a collimator, a CPC, etc. As indicated above, the beam of the second device light may be broader (larger FWHM) than the beam of the first luminescent material light (and optionally first device light). In specific embodiments, a single optical element is configured downstream of both the first window element and second window element.

In yet a further aspect the invention also provides a method for controlling a beam shape of a beam of system light, the method comprising controlling the first light generating device and the second light generating device of the light generating system as e.g. defined above.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

The terms "visible", "visible light" or "visible emission" and similar terms refer to light having one or more wavelengths in the range of about 380-780 nm. Herein, UV may especially refer to a wavelength selected from the range of 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

In yet a further aspect, the invention also provides a lamp or a luminaire comprising the light generating system as defined herein. The luminaire may further comprise a housing, optical elements, louvres, etc. etc. . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a lighting device selected from the group of a lamp, a luminaire, a projector device, a disinfection device, and an optical wireless communication device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the first light generating device, the second light generating device, and the window element.

A lighting device or a lighting system may be configured to generate device light (or "lighting device light") or system light ("or lighting system light"). As indicated above, the terms light and radiation may interchangeably be used.

The lighting system may comprise a light source. The system light may in embodiments comprise one or more of light source light and converted light source light (such as luminescent material light).

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
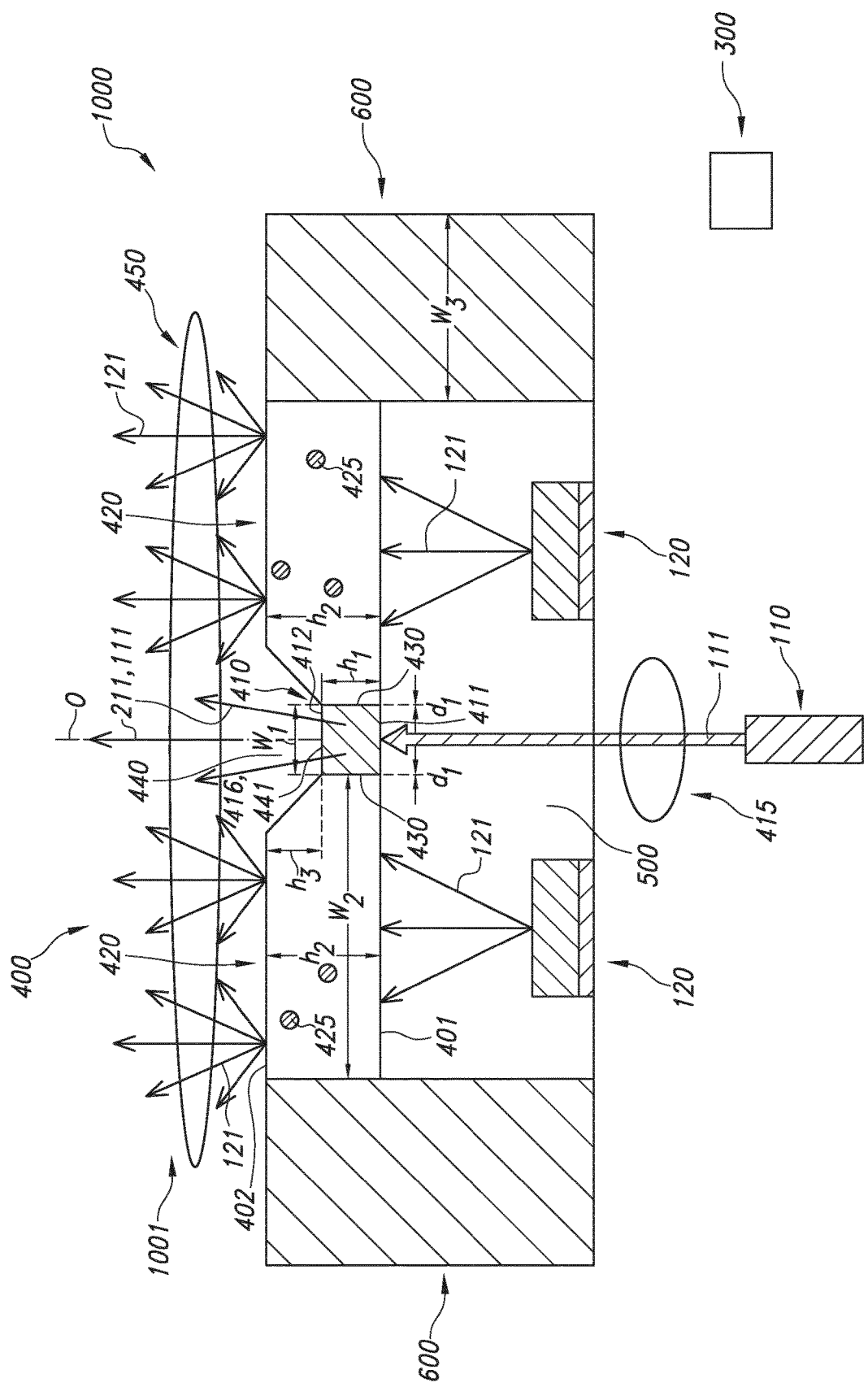
FIG. 1 schematically depicts an embodiment.

FIG. 1 schematically depicts an embodiment of a light generating system 1000 comprising a first light generating device 110, a second light generating device 120, a first luminescent material 210, a window element 400, and a light mixing chamber 500.

The first light generating device 110 may be configured to provide first device light 111 (in the light mixing chamber 500). The first light generating device 110 may comprise one or more of a laser and a superluminescent diode. Reference 415 refers to optics, which may be used to provide a substantial part of the first device light to the first luminescent material 210. Hence, a substantial part of the first device light 211 may be received by the first luminescent material 210 without intermediate reflections.

The second light generating device 120 may be configured to generate second device light 121 (in the light mixing chamber 500). The second light generating device 120 may comprise a solid state light source. The second light generating device 120 may comprise one or more LEDs.

In embodiments, the second device light 121 may be white light.

The light mixing chamber 500 may be at least partly defined by the window element 400.

The window element 400 may comprise (i) a first window element part 410 comprising the first luminescent material 210. The first window element part 410 may be configured in a light receiving relationship with the first light generating device 110, and (ii) a second window element part 420. The second window element part 420 may be translucent for the second device light 121. The second window element part 420 may be configured in a light receiving relationship with the second light generating device 120. The first window element part 410 and the second window element part 420 may be configured in thermal contact with each other. The first window element part 410 and the second window element part 420 may differ in material composition. The second window element part 420 may for instance comprise scattering elements 425 like particles or grain boundaries. Hence, the second window element may comprise of an essentially transparent material including some scattering elements 425, which may provide the translucent properties to the second window element part.

Reference 401 indicates an upstream face of the window element and reference 402 indicates a downstream face of the window element. References 411 and 412 indicate an upstream face and a downstream face, respectively, of the first window element part 410. A distance between those faces 411,412 may be indicate with reference h1. In embodiments, over at least 50%, such as at least 70% of the cross-sectional area A1 of the first window element part 410, the upstream face 411 and the downstream face 412 may be configured parallel.

Reference W1 indicates a width of the first window element part 410 and reference W2 indicates a width of the second window element part 420. The cross-sectional areas may be configured parallel to the respective widths (and perpendicular to a normal to the respective window element parts). Reference O indicates an optical axis of the system 1000. The normal may be configured parallel to the optical axis O.

The first luminescent material 210 may be configured to convert at least part of the first device light 111 into first luminescent material light 211.

The first window element part 410 may be configured to transmit part of the first device light 111.

In an operational mode of the light generating system 1000 the first light generating device 110 and first luminescent material 210 may be configured to generate white light emanating from a downstream side 416 of the first window element part 410. The white light may comprise first luminescent material light 211 and transmitted first device light 111.

In embodiments, the first light generating device 110 may be configured to generate blue first device light 111.

In specific embodiments, the first luminescent material 210 may be configured to convert at least part of the first device light 111 into first luminescent material light 211 having intensity at one or more wavelengths selected from the wavelength range of 530-750 nm.

The first window element part 410 may be configured to transmit less than 1% of the first device light 111 reaching the first window element part 410. In an operational mode of the light generating system 1000 the first light generating device 110 and first luminescent material 210 may be configured to generate white light emanating from a downstream side 416 of the first window element part 410. Especially, the white light may comprise the first luminescent material light 211.

In embodiments, the second window element part 420 (i) may be configured to transmit at least 30% of the second device light 121 under perpendicular radiation of the second device light 121 and/or (ii) may be configured to reflect at least 30% of the second device light 121 under perpendicular radiation of the second device light 121.

In embodiments, the first window element part 410 may comprise a ceramic body, and/or the second window element part 420 may comprise a ceramic body.

In embodiments, the first window element part 410 and the second window element part 420 are at least partly (optically) separated by a reflective element 430.

In embodiments, the reflective element 430 may have a thickness (d1) of at maximum 1 μm. In embodiments, the reflective element 430 may have a higher thermal conductivity than the first window element part 410 and/or the second window element part 420. The reflective element 430 is an embodiments of an optical separation element.

In specific embodiments, the reflective element 430 may comprise one or more of aluminum, silver and copper.

In embodiments, the first window element part 410 may have a first height h1 and the second window element part 420 has a second height h2. In specific embodiments, h1<h2.

Especially, the second window element part 420 may define a second window element cavity 440 configured at a downstream side 416 of the first window element part 410. Reference h3 indicates the height or depth of the second window element cavity 440.

In specific embodiments, the second window element cavity 440 may be configured as reflector cavity. Especially, at a light entrance side 441 of the second window element cavity 440 at least part of the first window element part 410 may be configured. As schematically depicted, the light entrance side of the second window element cavity may in embodiments essentially coincide with the downstream face 412 of the first window element 410.

In embodiments, the first window element part 410 may have a first cross-sectional area A1. Further, in embodiments the second window element part 420 may have a second cross-sectional area A2. Especially, $0.001 \leq A1/A2 \leq 0.1$.

In specific embodiments, the light generating system 1000 may further comprising a thermally conductive element 600 (having a higher thermal conductivity than the first window element part 410 and/or the second window element part 420). Especially, the light mixing chamber 500 may be partly defined by the thermally conductive element 600. Yet, in embodiments the thermally conductive element 600 may comprise or may be thermally coupled to one or more of a heat sink, a heat pipe, and a heat spreader.

The light generating system 1000 may be provided a light package, with all elements integrated in a single device or module.

As schematically depicted, in embodiments the light generating system 1000 may further comprise a control system 300. Especially, the control system 300 may be configured to control a beam shape of system light 1001 emanating from the light generating system by controlling the first light generating device 110 and the second light generating device 120.

In an aspect, the invention also provides a method for controlling a beam shape of a beam of system light 1001, the method comprising controlling the first light generating device 110 and the second light generating device 120 of the light generating system 1000.

Hence, with such light generating system a controllable spatial power distribution may be provided.

Figure 2A:
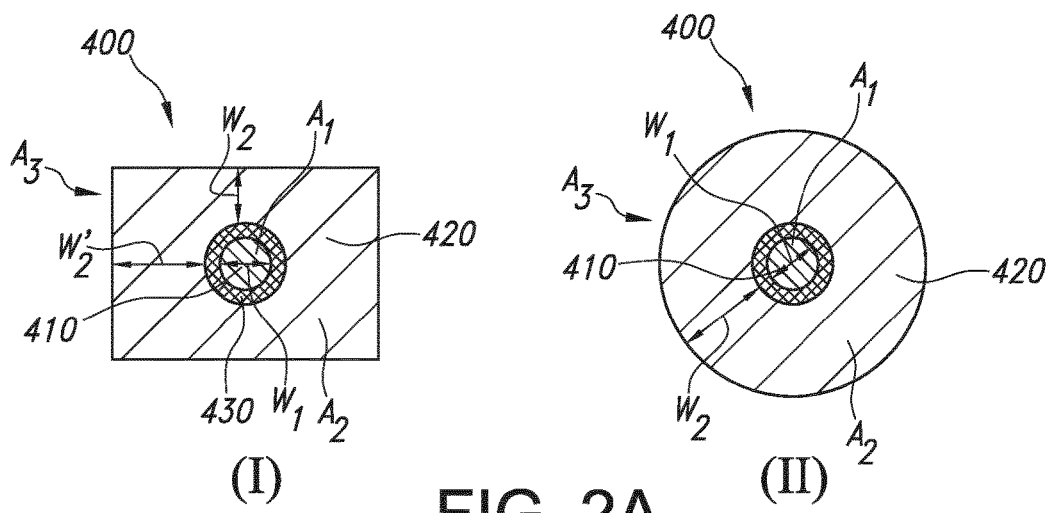
FIGS. 2*a*-2*b* schematically depict some aspects.

FIG. 2a schematically depict some top views of the window element 400 including the first window element part 410, the second window element part 420, and the optional intermediate reflective element 430, which may be used to optically separate the first window element part 410 and the second window element part 420. The respective cross-sectional areas A1 and A2 are indicated. The total cross-sectional area of the window element 400 may be defined as A3.

Figure 2B:
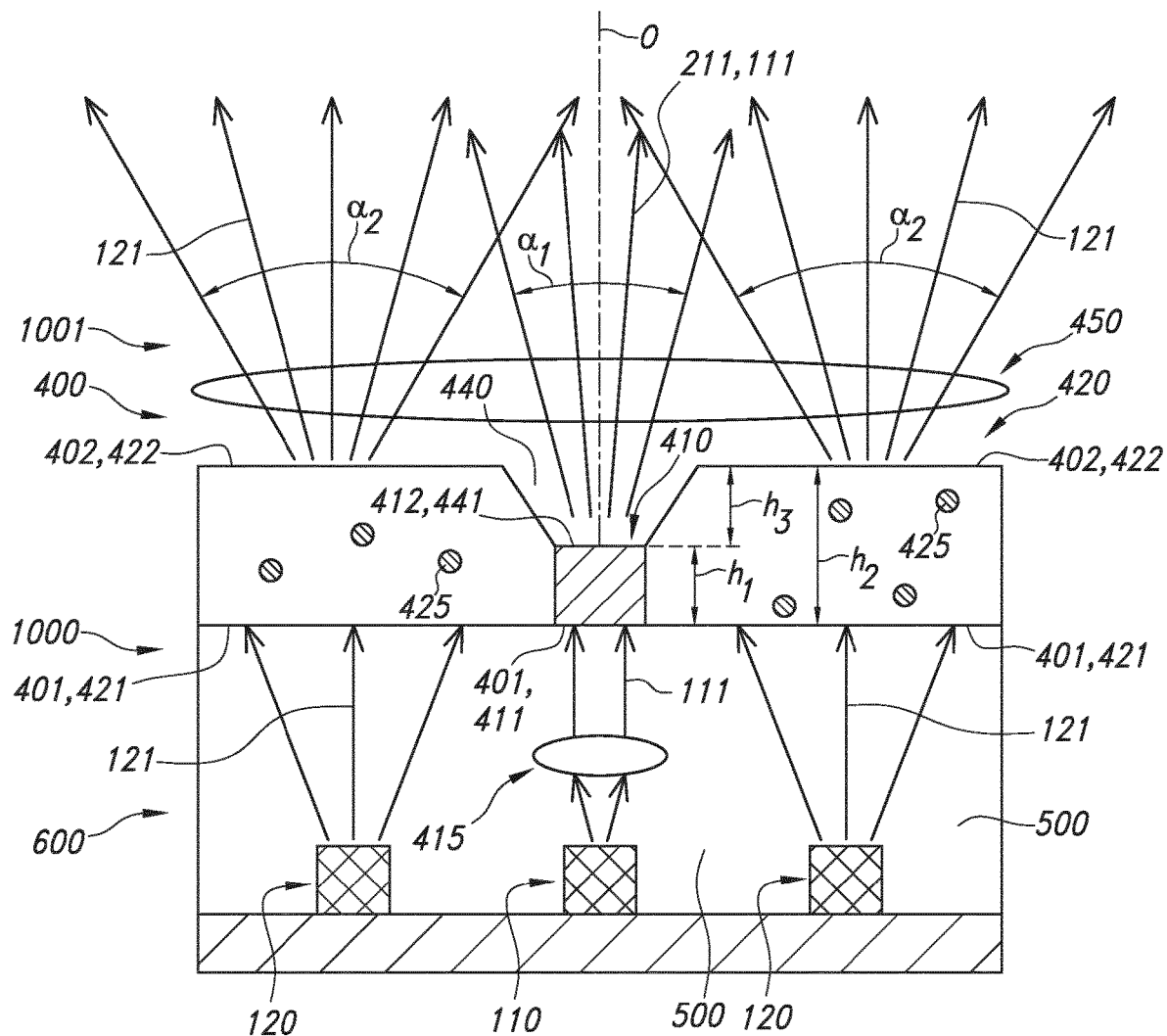

FIG. 2b schematically depicts that the beam width, indicated with beam angles α1 for a beam of first luminescent material light 211, and α2 for a beam of second device light may be different, especially the former smaller than the latter. The beam angles may be defined by the full width half maxima.

In embodiments, the light from the first window element may be collimated to ≤6° FWHM, preferably ≤5°, more preferably ≤4°, most preferably ≤3° FWHM (full width half maximum). Hence, α1 may be at maximum 6°. Typically, the light from the second window element may be collimated to ≥7° FWHM, such as especially ≥10°, more preferably ≥15°, most preferably ≥20 such as for example 25° FWHM. Hence, α2 may be at minimum 6°. Collimation may e.g. be achieved with a lens or other optical element, indicated with reference 450. Optics 450 may be used to provide relative narrow beams. The optics may in embodiments comprise collimating optics, such as lenses, reflectors, collimators, compound parabolic concentrator type optical elements. As indicated above, in specific embodiments, a single optical element is configured downstream of both the first window element and second window element.

References 421 and 422 indicate an upstream face and a downstream face, respectively, of the second window element part 420. A distance between those faces 421, 422 may be indicate with reference h2. In embodiments, over at least 50%, such as at least 70% of the cross-sectional area A2 of the second window element part 420, the upstream face 421 and the downstream face 422 may be configured parallel.

Figure 3:
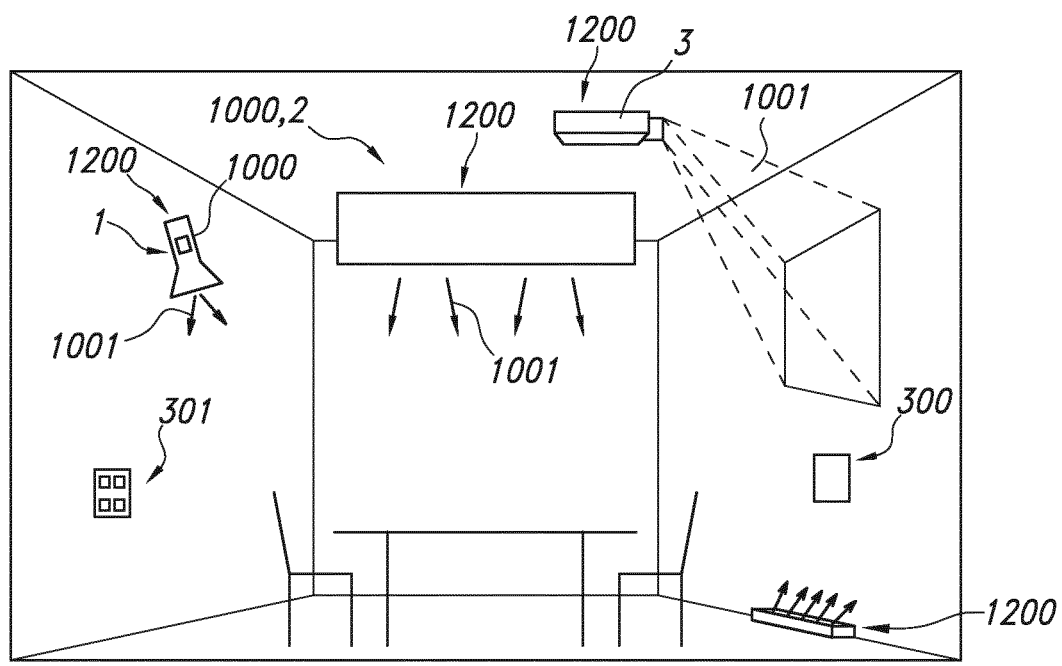
FIG. 3 schematically depict some further embodiments.

FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a lighting device 1200 selected from the group of a lamp 1, a luminaire 2, a projector device 3, a disinfection device, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a first light generating device, a second light generating device, a first luminescent material, a window element, and a light mixing chamber, wherein:
   the first light generating device is configured to provide first device light;
   wherein the first light generating device comprises one or more of a laser and a superluminescent diode;
   the second light generating device is configured to generate second device light; wherein the second light generating device comprises a solid state light source;
   the light mixing chamber is defined by the window element and reflective walls, wherein the reflective walls having an average reflectivity for the second device light of at least 50%;
   the window element comprises (i) a first window element part comprising the first luminescent material, wherein the first window element part is configured in a light receiving relationship with the first light generating device, and (ii) a second window element part, wherein the second window element part is translucent for the second device light, and wherein the second window element part is configured in a light receiving relationship with the second light generating device; wherein the first window element part and the second window element part are configured in thermal contact with each other; wherein the first window element part and the second window element part differ in material composition;
   the first luminescent material is configured to convert at least part of the first device light into first luminescent material light;
   the reflectivity of the second window part is selected from the range of 30-70% for the second device light; and
   wherein the second window element part does not comprise a luminescent material that is configured to convert the second device light.

2. The light generating system according to claim 1, wherein the second light generating device comprises one or more LEDs.

3. The light generating system according to claim 1, wherein the first window element part is configured to transmit part of the first device light, wherein in an operational mode of the light generating system the first light generating device and first luminescent material are configured to generate white light emanating from a downstream side of the first window element part, wherein the white light comprises first luminescent material light and transmitted first device light.

4. The light generating system according to claim 3, wherein the first light generating device is configured to generate blue first device light, and wherein the first luminescent material is configured to convert at least part of the first device light into first luminescent material light having intensity at one or more wavelengths selected from the wavelength range of 530-750 nm.

5. The light generating system according to claim 1, wherein at least 70% of the second device light which escapes from the window element escapes via the second window element.

6. The light generating system according to claim 1, wherein the first window element part comprises a ceramic body, and wherein the second window element part comprises a ceramic body.

7. The light generating system according to claim 1, wherein the first window element part and the second window element part are at least partly separated by a reflective element.

8. The light generating system according to claim 7, wherein the reflective element has a higher thermal conductivity than the first window element part and/or the second window element part.

9. The light generating system according to claim 1, wherein the first window element part has a first height (h1) and wherein the second window element part has a second height (h2), wherein h1<h2, and wherein the second window element part defines a second window element cavity configured at a downstream side of the first window element part.

10. The light generating system according to claim 9, wherein the second window element cavity is configured as reflector cavity wherein at a light entrance side of the second window element cavity at least part of the first window element part is configured.

11. The light generating system according to claim 1, wherein the first window element part has a first cross-sectional area A1, wherein the second window element part has a second cross-sectional area A2, wherein $0.001 \leq A1/A2 \leq 0.1$.

12. The light generating system according to claim 1, further comprising a thermally conductive element, wherein the light mixing chamber is partly defined by the thermally conductive element, wherein the thermally conductive element comprises or is thermally coupled to one or more of a heat sink, a heat pipe, and a heat spreader.

13. The light generating system according to claim 1, further comprising a control system configured to control a beam shape of system light emanating from the light generating system by controlling the first light generating device and the second light generating device.

14. A method for controlling a beam shape of a beam of system light, the method comprising controlling the first light generating device and the second light generating device of the light generating system according to claim 1.

15. A lighting device selected from the group of a lamp (1), a luminaire (2), a projector device (3), a disinfection device, and an optical wireless communication device, comprising the light generating system according to claim 1.

* * * * *